United States Patent [19]

Groeper

[11] 4,043,218
[45] Aug. 23, 1977

[54] PORTABLE WHEEL-BALANCER

[76] Inventor: Lawrence H. Groeper, 5223 Armida Drive, Woodland Hills, Calif. 91364

[21] Appl. No.: 745,395

[22] Filed: Nov. 26, 1976

[51] Int. Cl.² .............................................. G01M 1/12
[52] U.S. Cl. ........................................ 73/486; 73/487
[58] Field of Search ................. 73/485, 486, 487, 480; 144/288 A; 279/106

[56] References Cited

U.S. PATENT DOCUMENTS

| 113,049 | 3/1871 | Harris | 144/288 A |
|---|---|---|---|
| 2,698,537 | 1/1955 | Taylor | 73/486 |
| 3,045,497 | 7/1962 | Lackie | 73/486 |
| 3,463,208 | 8/1969 | Turpin | 144/288 A |

*Primary Examiner*—James J. Gill
*Attorney, Agent, or Firm*—Ralph B. Pastoriza

[57] ABSTRACT

A suspension type portable wheel-balancer for "do-it-yourself" automobile owners includes a vertical hollow shaft with a plate member threadedly adjustable at a given horizontal level on the shaft. A suspending wire is actually secured in the interior of the shaft and extends out the top where it may be suspended from any appropriate fixture. The plate member includes three cam members equally radially spaced from the axis of the shaft serving to engage the inner periphery of the hub opening of the automobile owner's wheel to position the wheel in exact coaxial alignment with the axis of the hollow shaft and suspending wire. Each cam member is eccentrically rotatably mounted so that the radial distance of the radially most distant points of the cam members can be adjusted and locked in place to correspond to the specific radius of the hub opening of the automobile owner's wheels.

5 Claims, 4 Drawing Figures

PORTABLE WHEEL-BALANCER

This invention relates generally to wheel-balancers and more particularly to an improved portable wheel-balancer of the suspension type for use by an individual automobile owner.

BACKGROUND OF THE INVENTION

Balancing of automobile wheels, truck wheels and the like is normally carried out in a commercial garage by more or less permanent equipment at the garage. Static type balancers as opposed to dynamic balancers are normally used. Essentially, the wheel is balanced by positioning the hub opening over a conical structure which centers the wheel, the conical structure itself being supported at a single fulcrum point slightly above the center of gravity of the wheel. Any tilting of the wheel will indicate an imbalance.

Other types of static balancing devices operate on the principle of suspension balancing wherein a hollow vertical shaft includes a suspending wire secured within the shaft at an axial point and passing out the top of the shaft. A wheel supporting plate structure in turn is centrally secured to the shaft in a horizontal plane and the hub opening in the wheel to be balanced rests on this plate with the hollow shaft passing through the center of the opening.

If the wheel is precisely coaxially centered with respect to the shaft and suspending wire, any imbalance will result in tilting and can be immediately observed by the position of the suspending wire passing out the top of the shaft; that is, it will be closer to one peripheral portion than another.

In order to provide precise coaxial centering of the wheel hub opening relative to the shaft and suspending wire, a conical arrangement could be provided on the supporting plate similar to those used in commercial garages. However, variation in the size of the wheel hub opening and different distances of the plane of the opening from the center of gravity of the wheel result in different levels of the wheel being supported by the conical portion and thus a shift in the center of gravity of the wheel relative to the fixed point within the vertical hollow shaft at which the suspending wire is connected. The sensitivity of the balancing system is thus dependent upon the size of the hub opening and the geometry of the wheel.

In an effort to overcome the foregoing problems, various arrangements for supporting the hub opening of a wheel in an exact coaxial relationship on a flat plate have been proposed. For example, three radial projections from the surface of the plate could engage interior circumferentially spaced points of the hub opening to hold the wheel on the plate in coaxial relationship. However, the exact positioning of these projections at precisely equally radially spaced points from the shaft axis would have to be tailored for each different sized hub opening. It is vitally important that the wheel hub opening be precisely coaxially centered with respect to the suspending wire and shaft if accurate balancing is to be achieved.

BRIEF DESCRIPTION OF THE PRESENT INVENTION

With the foregoing in mind, the present invention contemplates the provision of an improved portable wheel-balancer of the suspension type for use by individual automobile owners in their own garages or even when out on the road. Basically, this improved wheel-balancer provides a centering means for the center hub opening in a wheel which can be very easily and extremely accurately adjusted to fit precisely the hub opening in the particular automobile owner's wheels. The centering arrangement can then be locked since the one person will normally only be balancing his own wheels and thus further adjustments are not necessary.

Briefly, in accord with the invention, a hollow vertical shaft is provided with a suspending wire secured axially to the interior of the shaft and passing out the top thereof. A flat support plate is centrally secured to the shaft at a level such that the point of securement of the suspending wire is slightly above the center of gravity of a wheel resting on the plate. At least three cam members are provided on the plate at equally circumferentially and radially spaced points from the axis of the shaft to define three equally radially spaced engagement points for the inside periphery of the hub opening in the automobile owner's wheel to be balanced. Each of the cam members is rotatably mounted about an eccentric axis so that the radial distance of its furthermost radial point can be adjusted within a given range and whereby be tailored precisely to the size of the hub opening of the wheel.

With respect to the foregoing, a further feature of the invention contemplates the provision of a simple fixture in the form of a threaded stud with a collar which can be positioned over the shaft and revolved about the shaft to index the three cam members to precisely the same identical radial distances from the shaft axis.

BRIEF DESCRIPTION OF THE DRAWINGS

A better understanding of this invention as well as further features and advantages thereof will be had by now referring to the accompanying drawings in which.

DETAILED DESCRIPTION OF THE PREFERRED EMBODIMENT

Figures 1, 2, 3, 4:
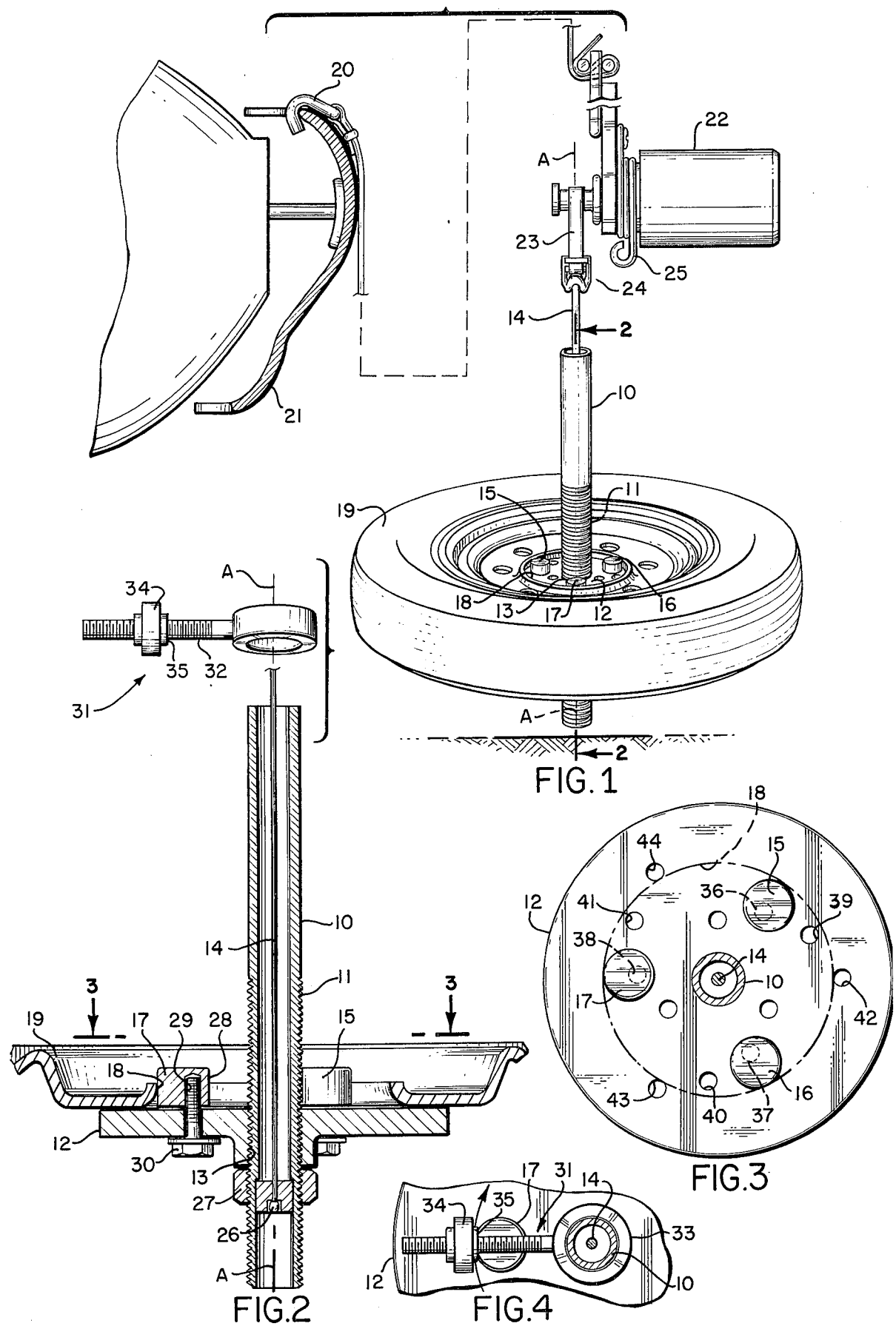
FIG. 1 is a perspective view of the portable wheel balancer of this invention illustrating a simplified means for suspending the balancer in a balancing operation.
FIG. 2 is an enlarged cross section taken in the direction of the arrows 2-2 of FIG. 1 and further illustrating a fixture supplied as a component part of the structure for adjustment purposes.
FIG. 3 is a top plan view partly in cross section of the balancer taken in the direction of the arrow 3-3 of FIG. 2 but with the wheel removed; and, FIG. 4 is a fragmentary view taken in the direction of the arrows 4-4 of FIG. 2 illustrating the referred to fixture in greater detail.

Referring first to FIG. 1, the portable wheel-balancer includes an elongated vertical hollow shaft 10 having a lower external threaded portion 11. A plate member 12 has a central threaded opening 13 receiving the lower external threaded portion of the shaft so that the plate can be supported at a desired or given horizontal level on the shaft.

Extending out the top of the hollow shaft 10 is a suspending wire 14 secured to the interior of the shaft at an axial point close to the horizontal level of the plate member 12.

At least three cam members 15, 16 and 17 are provided on the plate at equally circumferentially and radially spaced points from the axis A-A of the shaft 10. As will become clearer as the description proceeds, these cam members respectively engage points on the inner periphery of the hub opening 18 of the wheel 19 to be balanced such that the wheel 19 will be held in exact coaxial relationship with the axis A-A of the shaft 10.

It will be appreciated from the description provided thus far that if the extending end of the suspending wire 14 is fixed to an appropriate overhead structure and the wheel 19 is properly coaxially positioned relative to the shaft 10 and suspending wire 14, any imbalance of the wheel will result in a tilting of the wheel. Such tilting can be readily detected by the relative position of the extending suspension wire 14 with respect to the shaft 10.

While the wire 14 may be suspended from any convenient overhead fixture in an automobile owner's garage, there may be instances out in the road or other areas where no convenient place is available to suspend the balancer. In such event, the present invention also contemplates the provision of a suspending fixture 20 designed to hook over a bumper 21 of the owner's automobile. This fixture includes a manually rotatable drum 22 associated with a line 23 which can be connected to the extending end of the suspending wire 14 as indicated at 24. Manual rotation of the drum 22 will raise the shaft 10, associated plate member 12 and tire 19 as a unit a few inches off the ground or floor to effect the desired suspension. Any appropriate clutch type spring arrangement such as indicated at 25 may be used for preventing back motion of the drum 22.

Referring now to FIG. 2, further details of the wheel balancer will be evident. In FIG. 2 those components already described with respect to FIG. 1 have been designated by the same numerals. It will be noted that the axial measurement of the inner end of the suspending wire 14 shown at 26 is close to the horizontal level of the plate 12. Normally, the point 26 is slightly above the center of gravity of the wheel when positioned on the plate 12. Appropriate adjustment in the level of the wheel can be effected by simply threading the plate 12 with respect to the lower external threaded portion 11 of the shaft 10 to shift the center of gravity of the wheel relative to the point of securement and thus adjust the sensitivity of the balance. Once an appropriate adjustment has been made a lock nut 27 may be tightened against the bottom of the plate 12 to lock it in this position.

In the cross section of FIG. 2, it will be noted that the cam members, two of which are shown at 15 and 17 each have a smooth exterior cylindrical surface such as indicated at 28 for the cam member 17 and further each has an eccentric tapped opening such as indicated at 29 for the cam member 17. This tapped opening is arranged to receive an appropriate screw such as indicated at 30 passed through the plate 12 to secure the cam member in place. It will be appreciated because of the eccentric mounting that individual rotation of each of the cam members will change the radial distance of the furthest radial point of the cylindrical surface from the axis A-A of the shaft 10 and suspending wire 14. As is clear from FIG. 2, the cam members are adjusted such that they will engage inner peripheral points of the hub opening 18 for the wheel 19 and thus assure that the wheel 19 is coaxial with respect to the shaft.

In effecting individual adjustments of the cam members by rotating them about their eccentric tapped openings prior to tightening of the associated screws such as the screw 30, it is vitally important that their engaging portions with the inner periphery of the hub opening be all precisely the same radial distance from the axis A-A of the shaft 10. In order to index the cam members to assure this equivalency, there is provided a fixture indicated generally at 31 in FIG. 2 in the form of a horizontal threaded stud 32 terminating at one end in a collar 33 having an inside diameter corresponding to the diameter of the shaft 10 so as to surround the shaft 10. The other end of the threaded stud 32 terminates in a threaded nut 34 having a flat surface 34 facing the collar 33.

With the foregoing structure, threading of the nut 34 along the threaded stud 32 will vary the radial distance between the flat surface 35 of the nut 34 and the axis A-A of the shaft 10 when the collar 33 is disposed about the shaft.

As will be described in further detail subsequentially, the nut 34 is adjusted so that the flat surface 35 will engage the radially most distant point of each of the cam members when the fixture is lowered on the shaft 10 and revolved about the shaft thus serving to assure that the cam members are equally radially spaced from the central axis.

All of the foregoing will be better understood by now referring to FIG. 3 wherein the central hub opening of the wheel is indicated by the dashed circle 18, the radially most distant points on the cylindrical surfaces of the cam members 15, 16 and 17 engaging the inner periphery of this opening. The eccentric tapped openings for each of the cam members are indicated at dotted lines and register with a set of three openings, all precisely equally radially spaced and circumferentially spaced at 120° relative to the shaft 10. These plate openings are designated 36, 37 and 38.

It will be appreciated in FIG. 3 that if any one of the cam members such as the cam member 17 is rotated about its tapped opening corresponding to the opening 38 in the plate 12, its radially most distant point from the shaft 10 will move inwardly from the particular position illustrated. It is thus possible to vary the radial distance of the engagement points of the cams with the inner periphery of the central hub opening of the wheel within given limits determined by the eccentricity of the tapped openings.

In order to accommodate a larger range of hub openings of different radii, additional sets of three holes each of equal radial distances from the shaft 10 but different from the radial distances in the other sets can be provided. Thus, another set of such openings is shown in FIG. 3 at 39, 40 and 41 circumferentially spaced at 120° and at a greater radial distance from the shaft 10 than the openings 36, 37 and 38. A third set of even further radially spaced openings is indicated at 42, 43 and 44 and there may also be provided an inner set of three holes as shown of substantially less radial distance.

With the foregoing arrangement, an appropriate set of three holes can be selected in accord with the size of the central hub opening in the wheel for initial placement of the three cam members and then a fine adjustment of the proper radial distance effected by individually rotating the cam members.

With respect to the foregoing, the manner in which the fixture 31 described in FIG. 2 is utilized to assure that each of the adjusted cam members will have their most radially distant points at precisely the same radial distances will be evident. An adjustment of each of the cam members is first made which will approximate the size of the inner hub opening as closely as can be achieved. The fixture 31 then has the collar portion 33 passed over the shaft 14 and the nut 34 is threaded such that its flat engaging surface 35 will just bearly graze or touch one of the cam members such as cam member 17 of FIG. 4. The fixture 31 can then be revolved about the shaft 10 until its flat surface portion 35 is juxtaposed the outer cylindrical surface of the next cam member such as the cam member 15 of FIG. 3. This cam member 36 can have its cooperating eccentric screw loosened and then be rotated if necessary to effect just a slight touching or grazing with the flat surface 35 of the nut 34 on the fixture. The cam member 15 is then tightened.

The same operation is effected with the cam member 16. It will then be known that each of the cam members has its radially most distant points on its cylindrical surfaces at precisely the same distance from the axis of the shaft 10.

If the hub opening of the wheel after these adjustments have been made still results in some clearance or perhaps not enough clearance to encompass the three cam members, the above-described steps are repeated. For example, if the hub opening is too large to effect three point engagement with the cams, then one of the cam members is rotated about its eccentric pivot to move it radially more distant from the shaft 10 and the indexing fixture 31 then is adjusted by the threading of the nut 34 to define this specific radial distance. The other two cams are then adjusted to the same radial distance and the wheel hub opening again positioned over the cam members.

When precise registration is achieved with the central hub opening, the three cam members are permanently tightened in their set positions since the owner utilizing the balancing apparatus will normally be balancing only his own wheels and thus further adjustments are not necessary.

From all of the foregoing, it will be appreciated that a very simple "do-it-yourself" wheel balancing device has been provided wherein an automobile owner himself can readily adapt the balancer to suit his own particular wheels. Of course, once the proper setting of the cam members has been achieved, it is always assured that the wheel is in precise coaxial relationship with the shaft 10 and suspending wire 14. As stated, any imbalance will result in a tilting of the wheel and appropriate counterweights can be added to balance off this imbalance. As stated, the degree by which the suspending wire 14 moves off from its center position relative to the top end of the shaft 10 provides a sensitive indication of any tilting as well as the direction of tilting.

From the foregoing description, it will thus be evident that the present invention has provided an improved wheel balancer particularly useful for individual owners of automobiles.

I claim:

1. A portable wheel-balancer including, in combination:
   a. a hollow vertical shaft having a suspending wire secured axially to the interior of said shaft and passing out the top thereof;
   b. a flat plate centrally secured to the shaft at a level such that the point of securement of said wire is slightly above the center of gravity of a wheel carried on said plate;
   c. at least three members on said plate equally circumferentially and radially spaced from the axis of said shaft to define three engagement points for the inside periphery of the hub opening in a wheel to be balanced so that said wheel itself is held in coaxial relationship with said shaft when resting on said plate, any imbalance of said wheel resulting in a tipping of the plate detectable by observing the extending portion of the suspending wire from the top of said shaft, each of said members being individually mounted on the surface of said plate so that the radial distance of the engaging portion of each member can be changed by individual movement of the members to accommodate center hub openings in wheels of different sizes; and
   d. a fixture in the form of a threaded stud terminating at one end in a collar receivable over said shaft and at its other end in a threaded nut defining a flat surface facing said collar, threading of said nut changing the radial distance between said flat surface and the axis of said shaft when said collar is received over said shaft, said flat surface serving as an indexing means to enable adjustment of the engaged portions of said members at equal radial distances from said shaft by revolving said fixture about said shaft and positioning said members to have the radial distances of these radially most distant points grazed by said flat surface.

2. A portable wheel-balancer including, in combination:
   a. an elongated vertical hollow shaft having a lower external threaded portion;
   b. a plate member having a central opening threadedly receiving said lower external threaded portion of said shaft to support said plate member at a given horizontal level on said shaft;
   c. a suspending wire secured to the interior of said shaft at an axial point slightly above the center of gravity of a wheel on said plate member passing axially out the upper end of said shaft;
   d. at least three cam members each having a smooth exterior cylindrical surface with its cylindrical axis parallel to the axis of said shaft, and each having an eccentric tapped opening in its under side, said plate having three openings at equally radially spaced points from said shaft, said points being circumferentially spaced at 120°;
   e. individual screws passing through said holes from the underside of said plate and threadedly receivable in said eccentric tapped openings in said cam members to secure said cam members on the top surface of said plate member; and,
   f. a fixture including a threaded stud terminating at one end in a collar of internal diameter corresponding to the external diameter of said shaft and at its other end in a nut element having a flat surface normal to the axis of said stud and facing said collar such that the radial distance of said flat surface from said shaft when said collar is received on said shaft is adjustable by threading of said nut, whereby the rotative positions of each of said cam members before tightening of said screws can be adjusted such that the radial distance to the radially most distant point of the cylidnrical surfaces of the cam members from the axis of said shaft are all precisely equal, by revolving the fixture about said shaft and rotating each cam member about the axis of its eccentric tapped opening until its most radially distant point engages said flat surface of said fixture, the resulting radial distance being adjusted to correspond to the radius of the hub opening in a wheel to be balanced so that when the wheel is positioned on said plate, it is precisely coaxially positioned with the axis of said shaft, the said horizontal level of said plate relative to the point of securement of said suspending wire being adjustable by threading the plate along the lower external threaded portion of said shaft such that the center of gravity of said wheel substantially corresponds with said point of securement of said suspending wire, amy tilting of said wheel because of imbalance being immediately detectable by observing the position of said suspending wire relative to the shaft opening where it passes from the top of said shaft.

3. A portable wheel balancer according to claim 2 in which said plate member includes additional sets of three openings, the individual openings in each set being at the same radial distance from said shaft but different from the radial distances of the openings in the other sets so that wheel hub openings of radii substantially different from the radial distances of the first mentioned set of openings can be properly centered by proper selection of a set of three openings having the closest radial distance to the radius of the wheel hub opening.

4. A portable wheel-balancer according to claim 2, including a locking nut threadedly received on said lower external threaded portion of said shaft for securement against the underside of said plate member to thereby lock it at a desired horizontal level.

5. A portable wheel balancer according to claim 2, including a suspending fixture securable to the bumper of an automobile and including a manually rotatable drum and line for connection to said suspending wire to pull said wire upwardly and thereby raise a wheel supported on said plate and also raise the lower end of said shaft free of the ground so that a balancing operation on said wheel can be carried out.

* * * * *